United States Patent [19]

Pietsch

[11] 4,413,830
[45] Nov. 8, 1983

[54] SEAL ASSEMBLY FOR ROTATING SHAFTS

[75] Inventor: Günter Pietsch, Hamburg, Fed. Rep. of Germany

[73] Assignee: Howaldtswerke-Deutsche Werft Aktiengesellschaft Hamburg und Kiel, Kiel, Fed. Rep. of Germany

[21] Appl. No.: 326,812

[22] Filed: Dec. 2, 1981

[30] Foreign Application Priority Data

Dec. 5, 1980 [DE] Fed. Rep. of Germany ....... 3045855

[51] Int. Cl.³ .............................................. F16J 15/34
[52] U.S. Cl. ....................................... 277/27; 277/30; 277/65
[58] Field of Search .......................... 277/3, 27, 30, 65

[56] References Cited

U.S. PATENT DOCUMENTS

| 3,050,310 | 8/1962 | Kuiken | 277/30 |
| 3,311,381 | 3/1967 | Pech | 277/30 |
| 3,642,289 | 2/1972 | Basham et al. | 277/30 |
| 3,926,442 | 12/1975 | Müller | 277/27 |

Primary Examiner—Robert I. Smith
Attorney, Agent, or Firm—Jon M. Lewis

[57] ABSTRACT

A seal assembly for rotating shafts particularly for sterntube seals for ships comprises two slide rings mounted in a receiving ring and pressed against a counter-ring by means of the surrounding sea-water. Between the slide rings an annular space is formed into which a liquid medium is let. The outer slide ring being a hydrostatic seal is lifted by the liquid medium in the annular space against the force of a spring in the receiving ring so that a small amount of the liquid medium leaks out to lubricate the slide rings and to prevent entering of abrasive particles. The inner slide ring is a hydrodynamic seal and is urged into contact with the counter-ring by the hydrostatic head of the sea-water surrounding the seal assembly. The receiving ring is guided in the housing or on the shaft with some clearance so that the faces of the slide rings can maintain a position parallel to the counter-ring.

10 Claims, 4 Drawing Figures

SEAL ASSEMBLY FOR ROTATING SHAFTS

BACKGROUND OF THE INVENTION

The invention relates to seal assemblies for rotating shafts the oil lubricated bearings of which have to be protected against a liquid medium such as water. In preferred embodiments the invention relates to the outboard end of a sealing of the aft end of the stern tube bearing of a ship.

In the prior art a stern seal assembly is known in which a mechanical seal comprising a slide ring is used as seal between a void space and the sea-water surrounding the propeller shaft of a ship. The mechanical seal does not prevent sufficiently the sea-water to penetrate through the seal into the space and to bring in sand and other abrasive particles which create wear.

Recently it was proposed to protect the slide ring of a water seal against abrasion by providing a seal assembly with an annular space at the outboard end of the slide ring. The annular space was filled with a liquid medium not polluting the sea-water and was sealed against the sea-water by a lip seal through which the liquid medium could leak out thereby cleaning the lip seal. However, this structure showed some disadvantages e.g. because of differences in pressure of the sea-water and the insufficiencies of a lip seal.

SUMMARY OF THE INVENTION

It is an object of the present invention to improve the water seal of a seal assembly for rotating shafts so that a long safe life is achieved even with differing water pressure and abrasive particles in the water surrounding the seal assembly.

According to this invention the seal assembly comprises two sealing slide rings spaced apart and including an annular space which contains a liquid medium for lubricating and cleaning the slide rings respectively the gaps between the slide rings and a counter-ring. Both the slide rings are mounted in a receiving ring. The receiving ring is urged in the direction towards the counter-ring by the pressure of the surrounding sea-water. The slide rings work differently. A first slide ring which may be the sealing between the surrounding sea-water and the annular space is flexibly supported in the receiving ring and is formed as a hydrostatic seal so that the lubricating gap can be influenced by the pressure of a liquid medium in the annular space. Herewith the pressure in the annular space lifts the first slide ring a little so that a small amount of the liquid medium can leak out thereby lubricating the slide ring and scavenging away all dirt, at least as long as the pressure in the annular space is higher than the hydrostatic head of the surrounding water. A second slide ring which may be the sealing between the annular space and a drained void space in constructed as a hydrodynamic seal in which a gap for lubrication is formed only by a rotation either of the slide ring or of the counter-ring. The second slide ring is urged into contact with the counter-ring by the pressure which the sea-water exerts to the backside of the receiving ring.

As the diameter of a propeller shaft of a vessel can be greater than 1.5 m it is difficult to maintain slide rings and counter-ring in parallel relationship. Now, according to the present invention the receiving ring or the counter-ring or both the rings can be arranged as floating rings guided by the housing of the seal assembly or in a similar way. Herewith the pressure of the sea-water exerted to the backside of the receiving ring is used for equally pressing the slide rings against the counter-ring even if e.g. some deflection of the shaft occurs.

DESCRIPTION OF PREFERRED EMBODIMENTS

Figure 1:
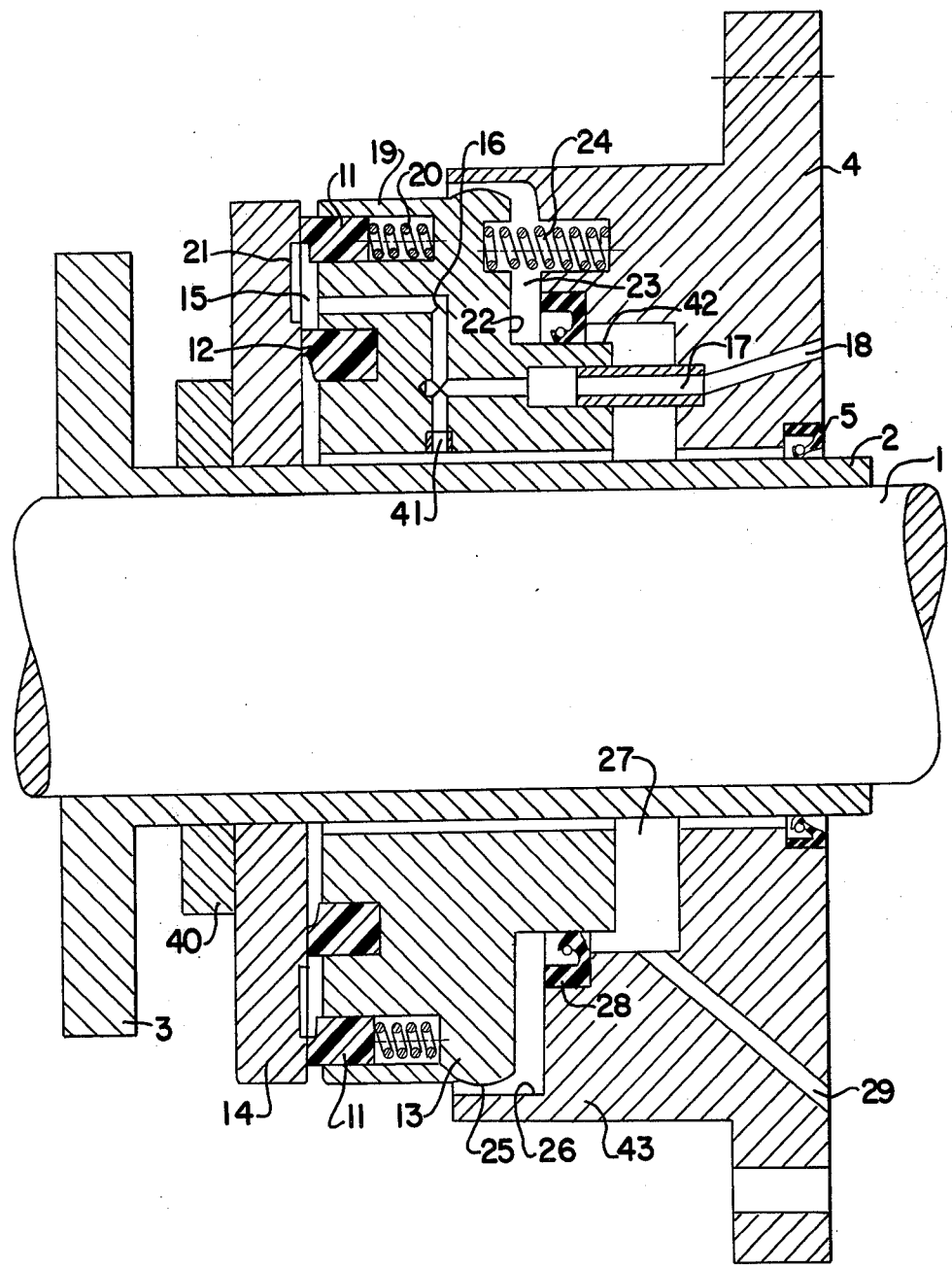
FIG. 1 is a longitudinal sectional view of a seal assembly for the aft end of a stern tube, in which the receiving ring with the slide rings is supported in a housing and the counter-ring is rotating with the shaft.

In FIG. 1 a propeller shaft 1 carries a sleeve 2 one end of which has a flange 3 for fastening to a propeller which is not shown in the drawing, and the sleeve 2 can extend in the stern tube. The seal assembly is mounted to the stern frame (not shown) containing the stern tube by means of a fastening flange 4. In flange 4 the aft oil seal 5 of the oil-lubricated stern tube bearing may be positioned.

The seal assembly comprises a first, outer slide ring 11 and and a second, inner slide ring 12 mounted in a non-rotating receiving ring 13 and pressed against a counter-ring 14. The counter-ring 14 rotates with the shaft 1 and is fastened to the sleeve 2 in any known way e.g. by a clamping ring 40. Slide rings 11 and 12 limit an annular space 15 between receiving ring 13 and counter-ring 14. Via supply piping 16, 17, 18 a liquid medium is supplied to the annular space 15 under pressure. The inner slide ring 12 is set in a circular slot of the receiving ring 13. The outer slide ring 11 is mounted in a circular groove 19 in which it is movable in axial direction and is forced against the counter-ring 14 by springs 20. The inner circular area of the face of slide ring 11 directed to counter-ring 14 is recessed so that the pressure in the annular space 15 can work on the recess 21 and lift the slide ring 11 against the force of the spring 20 as generally is known for hydrostatic seals.

A partial rear area 22 of the receiving ring 13 is exposed to the surrounding sea-water in a space 23. The hydrostatic head of the sea-water in space 23 presses the receiving ring 13 towards the counter-ring 14 and urges the face of the inner slide ring 12 into contact with the counter-ring 14. The pressure between receiving ring 13 and counter-ring 14 is independent from elongations of the shaft 1 but depends on the hydrostatic head of the sea-water surrounding the seal assembly. Springs 24 do not influence the pressure as long as the seal assembly is surrounded by water but are sufficiently effective when the seal assembly comes into or out of the water.

If the shaft with the counter-ring 14 does not rotate the second, inner slide ring 12 effects a tight seal. If shaft and counter-ring rotate a thin lubricating film of the liquid medium of the annular space 15 is formed in a narrow lubricating gap as generally is known for hydrodynamic seals. The gap width depends on the pressure by which the slide ring 12 is pressed against the counter-ring 14.

The counter-ring 14 consists of corrosion-resistant steel. The slide rings 11 and 12 are wearing elements and are made from carbon or are containing carbon or are made from a hard plastics such as polytetrafluoroethylene.

The slide rings 11,12 are coaxial and concentric. The circular areas of the counter-ring 14 coacting with the faces of the slide rings 11, 12 are in one radial plane as the sealing faces of the slide rings. This results in a short axial length of the seal assembly.

The partial rear area 22 of the receiving ring 13 axially exposed to the sea-water is larger than the total areas radially outside the inner slide ring 12 on the other side of the receiving ring 13. If the outer slide ring 11 should not be effective and sea-water enter into annular space 15 the pressure in the annular space will always be lower than the pressure exerted by the sea-water on the rear area 22.

The pressure of the liquid medium in the annular space 15 is usually a little higher than the hydrostatic head of the surrounding sea-water, so that a small amount of the liquid medium continuously leaks out. The force of springs 20 is so that the liquid medium can lift slide ring 11 from counter-ring 14 to form a narrow gap for lubrication and for scavenging. As liquid medium filtered sea-water can be used which is supplied from a tank (not shown) in the ship through the piping comprising a boring 18 in the fastening flange 4, a telescoped pipe 17 and several borings 16 in the receiving ring 13, the radial part of which being closed by a screw plug 41.

Means are provided to make axial and tilting motions of the receiving ring 13 possible with respect to the sleeve 2. The inner diameter of the receiving ring 13 is larger than the outer diameter of the sleeve 2. The receiving ring 13 is centered by a circular bulb 25 on a circumferential area. The bulb 25 is in loose contact with an inner supporting surface 26 of the housing 43 extending from the fastening flange 4. The sea-water pressing against the rear area 22 of receiving ring 13 can maintain the faces of slide rings 11,12 and of counter-ring 14 in parallel positions also in case the shaft deflects or for some other reasons the counter-ring 14 should not be parallel to fastening flange 4. The clearance between bulb 25 and supporting surface 26 is sufficient to let sea-water enter in the space 23 on the rear area 22 of receiving ring 13. The receiving ring is secured in the housing 43 or on the fastening flange 4 against rotation by any known means not shown in the drawing.

A void space 27 is formed essentially between receiving ring 13, sleeve 2 and fastening flange 4. The void space 27 is sealed against the annular space 15 by the inner slide ring 12, against the oil- lubricated stern tube bearing by a lip seal 5, and a further lip seal 28 is positioned between the fastening flange 4 and a circumferential shoulder 42 on the backside of the receiving ring 13. The lip seal 28 is so flexible as to allow motions of the receiving ring 13 which does not rotate. Any suitable means (not shown in FIGS. 1 to 3) for preventing rotation can be used.

The void space 27 collects the liquid medium penetrating at the inner slide ring 12 as a lubricant. The void space 27 is provided with a draining bore leading to a sump (not shown) inside the ship. Usually void space 27 is filled with air of atmospheric pressure.

Preferably all parts surrounding the sleeve 2 particularly slide rings 11 and 12 and counter ring 14 are made of two halves so that they can be replaced without demounting the propeller.

Figure 2:
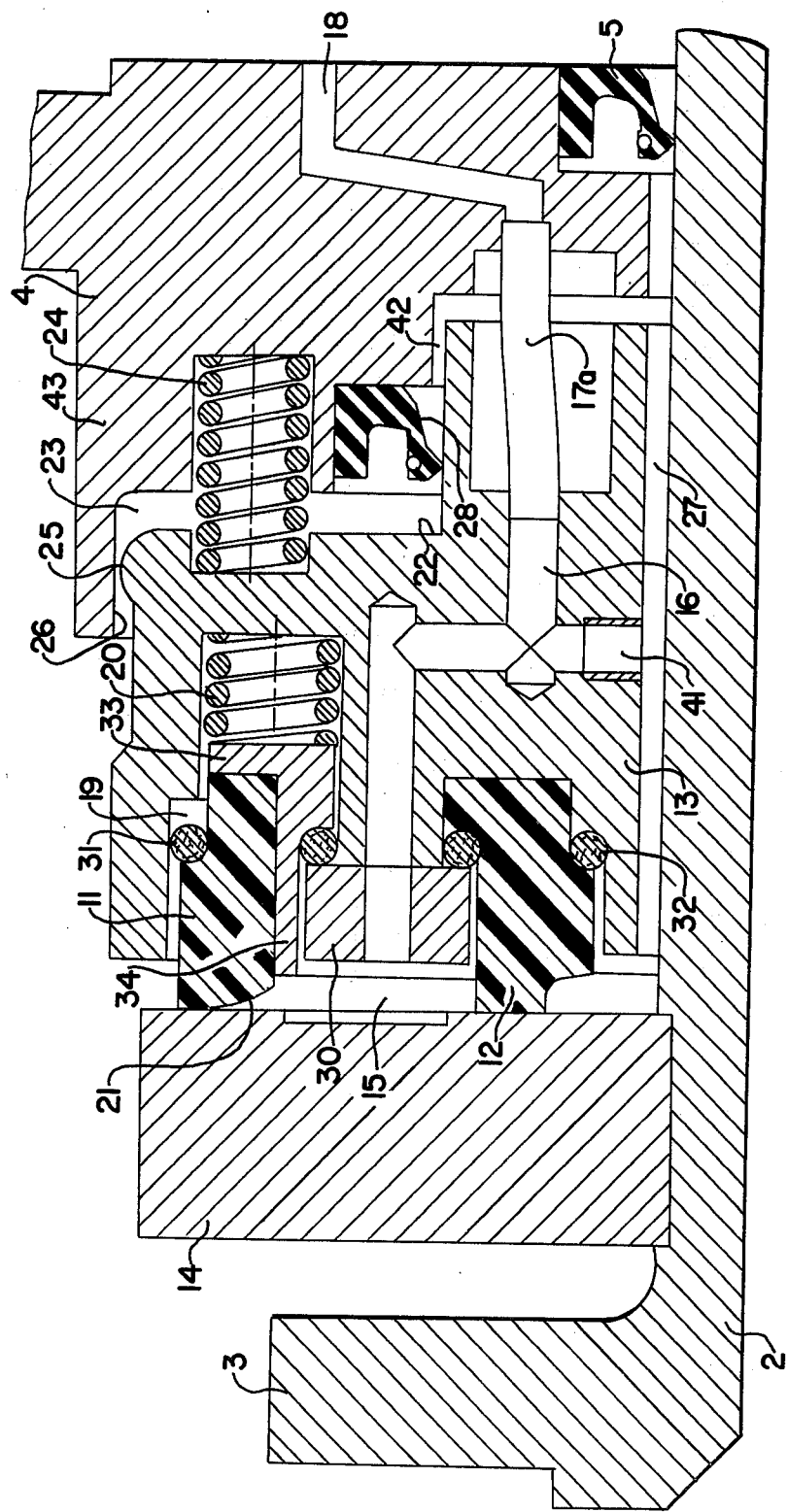
FIG. 2 is a half longitudinal sectional view of a seal assembly similar to that according to FIG. 1.

In FIG. 2 an embodiment similar to that of FIG. 1 is shown, and some more details are explained. In all drawings the same reference numbers are used for parts having the same function.

In FIG. 2 the first, outer slide ring 11 is carried by a supporting ring 34 which is inserted between the outer slide ring 11 and the springs 20 in the groove 19. The supporting ring 33 has a shoulder 34 projecting to the annular space 15, which shoulder 34 is a recessed area in addition to recess 21 of slide ring 11 against which the pressure of the liquid medium works. Outer slide ring 11 and supporting ring 34 are axially movable together in the groove 19 and are sealed by packings 31. There are packings 32 also at the second, inner slide ring 12. Both the slide rings 11, 12 are secured to the receiving ring 13 by a retaining ring 30 which limits the axial motion of the outer slide ring 11 towards the counter-ring 14.

In FIG. 2 the supply piping for the liquid medium to the annular space 15 comprises a flexible tube 17a as connection between the boring 18 in the fastening flange 4 and the borings 16 in the receiving ring 13. A flexible tube 17a is shown also in FIG. 3.

Figure 3:
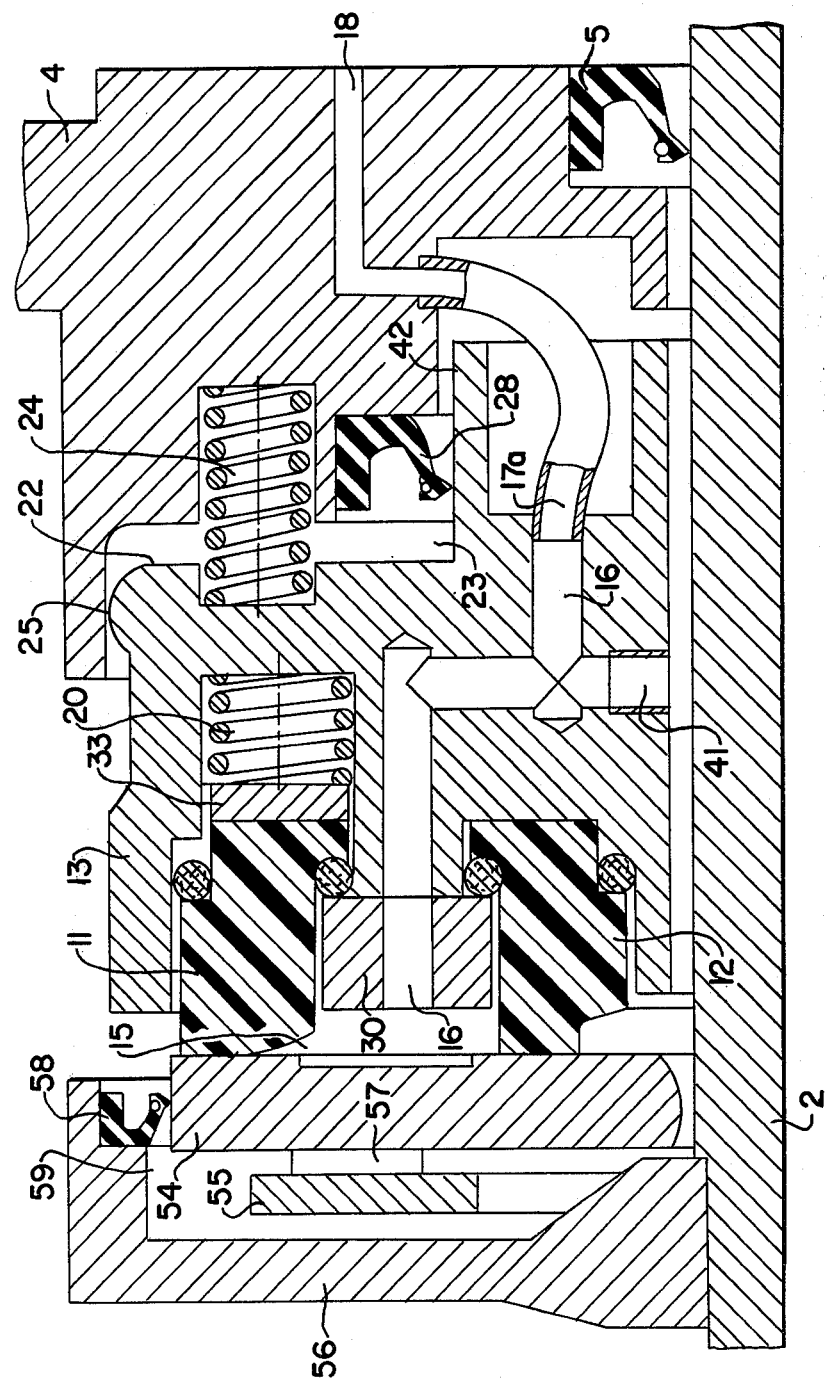
FIG. 3 is a view similar to FIG. 2 but in this embodiment also the counter-ring is loose so that it can tilt in a position parallel to the contacting faces of the slide rings.

In the embodiment according to FIG. 3 the counter-ring 54 is arranged as a floating ring so that not only the receiving ring 13 but also the counter-ring 54 can tilt a little to maintain a parallel position of counter-ring 54 and slide rings 11, 12. Counter-ring 54 is supported by a disk 55 provided with a pair of projections 57 on both sides. Instead of the projections 57 roll bodies can be used. FIG. 3 shows one projection 57 between disk 55 and counter-ring 57 only as the other one on the same side is 180° offset. Disk 55 is supported by a flange ring 56 mounted to the sleeve 2. Between flange ring 56 and disk 55 there is another pair of projections, not shown in the drawing. Disk 55 and projections 57 allow tilting motions of counter-ring 54 with respect to the flange ring 56 and the sleeve 2. Counter-ring 54 rotates with the shaft. A lip seal 58 is provided between the flange ring 56 and the counter-ring 54 so that the space 59 surrounding the disk 55 practically belongs to the void space 27.

Figure 4:
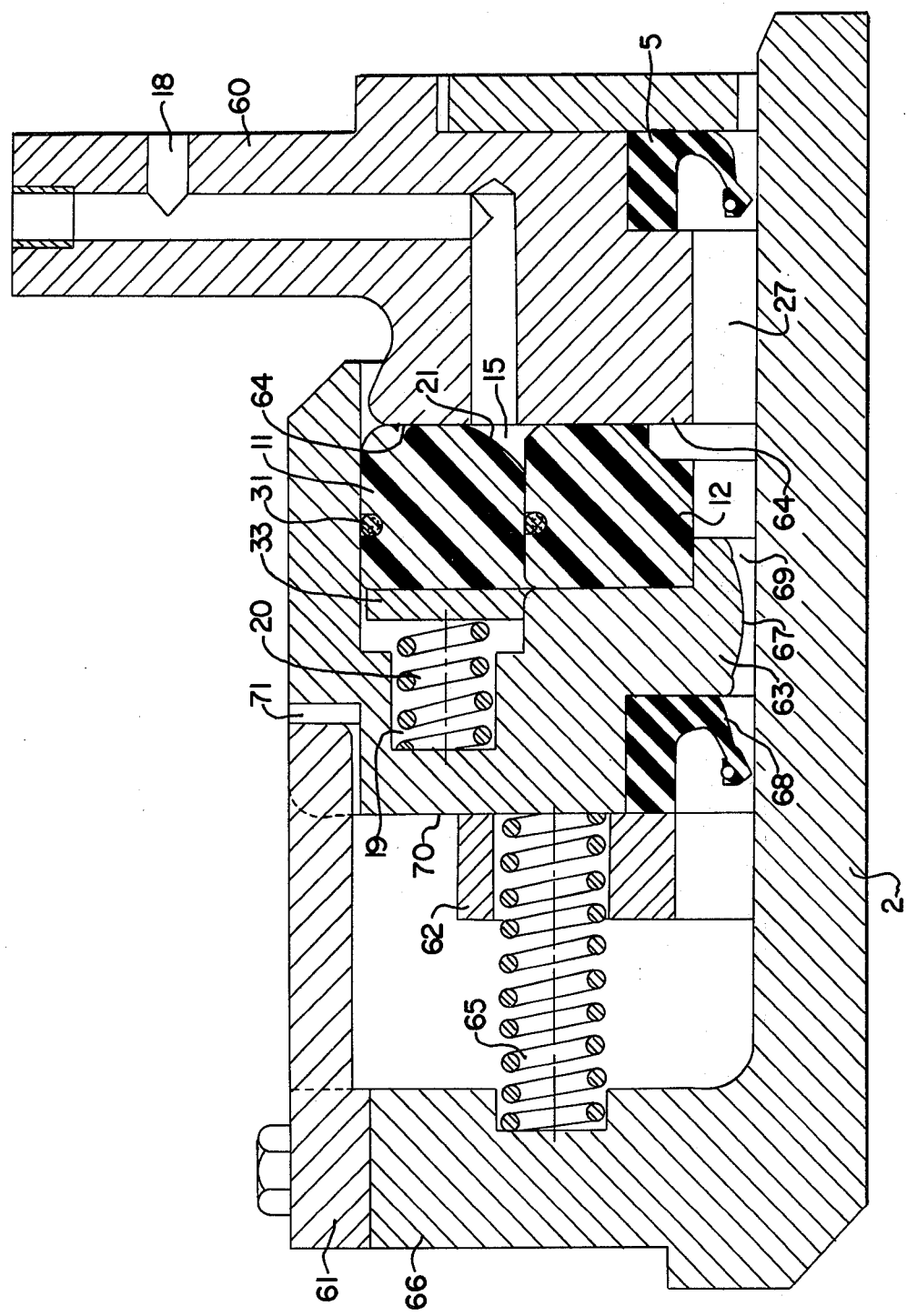
FIG. 4 is a half longitudinal sectional view of a seal assembly in which the receiving ring with the slide rings rotates with the shaft and the flanges for fastening the seal assembly to the stern frame is formed as counter-ring.

FIG. 4 shows an embodiment in which slide rings 11, 12 rotate with the sleeve 2 and are urged into contact with a counter-face 64 of fastening flange 60. The slide rings 11, 12 are mounted in a receiving ring 63 as described before and the pressure of the surrounding sea-water works on the rear side 70 of the receiving ring 63. A spring 65 is located between propeller flanges 63 and the rear side 70 and is guided by a guide ring 62 fastened to the receiving ring 63. A lip seal 68 yields axial and tilting motions of the receiving ring 63 with respect to the sleeve 2. The receiving ring 63 is centered on sleeve 2 by an inner bulb 63 which is in loose contact with the cylindrical surface 69 of sleeve 2. The receiving ring 63 is rotated by an engaging lever 61 mounted to propeller flange 66 and projecting in a groove 71 of ring 63. A boring 18 in fastening flange 60 is made for letting the liquid medium in the annular space 15, which is formed by the recess 21 of the outer slide ring 12.

With the seal assembly according to the present invention a mechanical seal of high safety and long safe life is achieved because the inner slide ring 12 is safely protected against abrasive particles and its wear is reduced as it is pressed against the counter-ring or counter-face with a pressure necessary for efficient sealing which depends on the head of the sea-water, and this pressure is uniformly distributed over the circular faces of both of the slide rings.

What is claimed is:

1. A seal assembly for rotating shafts, for use as a sea-water seal of an aft stern tube seal for ships, said assembly comprising two slide rings, namely, a first outer slide ring and a second inner slide ring radially spaced and concentrically arranged in substantially one plane;

a receiving ring which surrounds the rotatable shaft and is axially movable, and in which said slide rings are mounted on one side, the rear side of said receiving ring being partially exposed to the surrounding sea-water;

a counter-ring against which the slide rings are pressed, said slide rings, receiving ring and counter-ring forming a closed annular space for containing a pressurized liquid medium for lubricating said slide rings;

the first, outer slide ring sealing the annular space against the surrounding sea-water, said outer slide ring being flexibly supported in the receiving ring and comprising a hydrostatic seal;

a gap for lubrication which is influenced by the pressure of the liquid medium in said annular space; and the second, inner slide ring sealing said annular space against a drained void space at an inboard end of the sea-water seal, in operation said inner slide ring being made as a hydrodynamic seal and urged into contact with the counter-ring by the pressure of the sea-water which is acting against the rear side of the receiving ring, said outer slide ring being provided with a chamfered circumferential edge formed on its inner surface such that the chamfer is in contact with said annular space and also said counter-ring, whereby, said pressurized fluid in said annular space causes a slight opening of said chamfered circumferential edge so as to allow a slow escape of pressurized fluid from said annular space to the surrounding sea-water.

2. The seal assembly as set forth in claim 1 wherein the counter-ring is mounted to the sleeve on the shaft and is rotatable with the shaft and the receiving ring with the slide rings is not rotatable.

3. The seal assembly as set forth in claim 1 wherein the rear areas of the receiving ring which are axially exposed to the pressure of the sea-water are larger than the total areas radially outside the inner slide ring on the other side of the receiving ring.

4. The seal assembly as set forth in claim 1 wherein the areas of the counter-ring which are in contact with the faces of the slide rings from one radial plane.

5. The seal assembly as defined in claim 1 and further comprising means for maintaining a parallel position of the counter-ring and the faces of the slide rings.

6. A seal assembly for sealing a rotating shaft from a surrounding fluid medium which may contain abrasive and other particulate matter, said seal assembly comprising:

first and sealing rings which are concentric and radially displaced from each other in substantially one plane;

a receiving ring substantially of an annular shape and disposed concentrically with said shaft and formed with an inner diameter to define a predetermined peripheral gap between a shaft periphery and said inner diameter, said receiving ring having a front surface and a back surface and two concentric seating grooves formed in said front surface, in which grooves said first and second sealing rings are accommodated;

a counter-ring of annular shape and having a front face, said counter-ring being mounted also concentric with the shaft and next to said receiving ring, in such manner that the front face of said counter-ring is substantially perpendicular to the shaft axis, and such that the front face of the counter-ring faces the front surface of said receiving ring, said first and second sealing rings extending from this respective seating grooves to contact said front face of said counter-ring;

resilient means axially biasing said first sealing ring into contact with and against said front surface of said counter-ring;

an annular space having a cross section bounded by at least portions of surfaces of said first and second sealing rings, said annular space having therein pressurized fluid at a pressure higher than a pressure of said surrounding fluid medium, conduit means connecting said annular space to outside of the seal assembly to supply and refurbish said pressurized fluid continually;

a chamfered circumferential edge in the form of a sealing lip formed on an inner surface of said first sealing ring, said chamfer being so located as to be in contact with both the annular space and said front face of said counter-ring, whereby, said pressurized fluid in said annular space causes a slight opening of said sealing lip of said first sealing ring which is under pressurized contact with the front face of said counter-ring so a to allow a slow escape of pressurized fluid from the annular space to the surrounding fluid medium; and means conveying said surrounding fluid medium to said back surface of said receiving ring so that the receiving ring applies axial pressure on both said first and second sealing rings to contact and press against said counter-ring.

7. A seal assembly as in claim 6 wherein said counter-ring is mounted in fixed relation with said shaft so as to rotate with the shaft, and wherein said receiving ring is mounted to be nonrotatable.

8. A seal assembly as in claim 7 wherein said front face of said counter-ring has coplanar areas which contact said first and second sealing rings.

9. A seal assembly as in claim 8 wherein said second sealing ring includes a peripherally chamfered edge which is not in contact with said annular space, whereby the action of pressurized fluid in said annular space is to render a seal between said second sealing ring and the contacting surface of said counter-ring more effective, and to allow very little of the pressurized fluid to escape at said second sealing ring.

10. A seal assembly as in claim 6 wherein said back surface of said receiving ring has an area substantially greater than an exposed area of said second sealing ring, which exposed area is not within a respective said seating groove.

* * * * *

UNITED STATES PATENT AND TRADEMARK OFFICE
CERTIFICATE OF CORRECTION

PATENT NO. : 4,413,830

DATED : November 8, 1983

INVENTOR(S) : Gunter Pietsch

It is certified that error appears in the above-identified patent and that said Letters Patent is hereby corrected as shown below:

Column 5, line 64, (claim 6) before "sealing" insert -- second --.

Signed and Sealed this

Fourth Day of December 1984

[SEAL]

Attest:

GERALD J. MOSSINGHOFF

*Attesting Officer*  *Commissioner of Patents and Trademarks*